Jan. 22, 1963     S. C. BAKER     3,074,641
ELECTRONIC STEPPING INTEGRATOR CIRCUIT
Filed Nov. 29, 1957
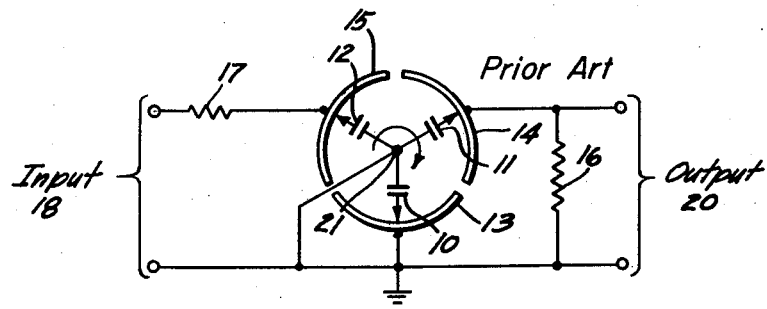
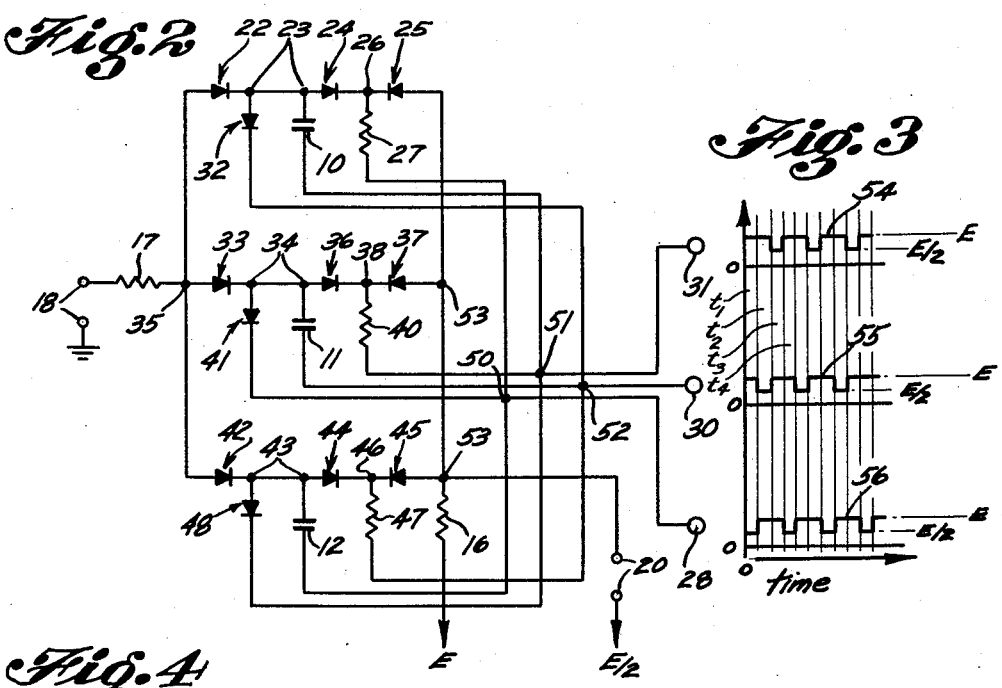
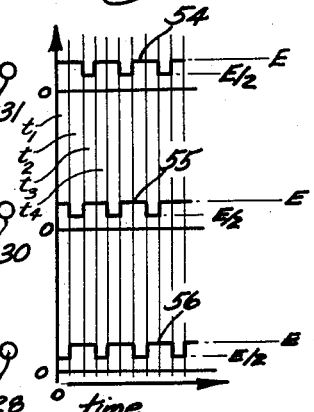
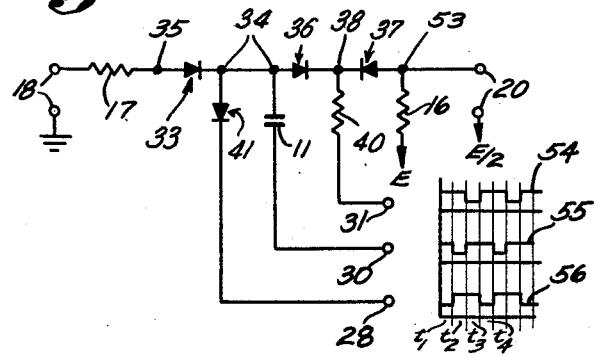
Stuart C. Baker
INVENTOR
Allen E. Botney, Agent
BY
ATTORNEY

United States Patent Office 3,074,641
Patented Jan. 22, 1963

3,074,641
ELECTRONIC STEPPING INTEGRATOR CIRCUIT
Stuart C. Baker, Rolling Hills Estates, Calif., assignor, by mesne assignments, to Thompson Ramo Wooldridge Inc., Cleveland, Ohio, a corporation of Ohio
Filed Nov. 29, 1957, Ser. No. 699,735
7 Claims. (Cl. 235—183)

The present invention relates to integrator devices in general and more particularly to a stepping integrator circuit that is entirely electronically constructed and operated.

An electronic integrator is a device which produces an output voltage that is proportional to the integral of the input voltage, with some weighting function for the contribution of voltage existing at prior times. The weighting function for a simple resistor-capacitor integrator is, for example, exponential in nature. For certain classes of continuous input functions, however, a square weighting function is desirable as, for example, in correlation computer applications. A square weighting function simply means that all voltages from a time $t_0$ to the present moment is weighted with equal importance and, therefore, integration with a square weighting function represents a true integration from time $t_0$ to the present. No contribution is allowed from a voltage existing beyond time $t_0$ in the past.

A stepping integrator device is characterized by a square weighting function. In the past, stepping integrator devices have been built using a mechanical commutator of one sort or another and, as a result, there have been serious problems of mechanical wear or of bad electrical contact due to dirt, corrosion, or other similar factors. In consequence thereof, replacement of parts was required after relatively short periods of use and, furthermore, the poor electrical contact introduced errors into the system such that the output voltage did not always accurately reflect the integral of the input voltage.

It is, therefore, an object of the present invention to provide an all electronic stepping integrator circuit having no moving mechanical parts.

It is a further object of the present invention to provide a stepping integrator device that will function accurately for long periods of time without replacement.

The present invention resolves the above-mentioned problems by providing an electronic switching arrangement as a substitute for the mechanical commutator parts customarily employed in the prior stepping integrator art. More particularly, a combination of diodes and resistors is provided for each of three or more capacitors across which the integrated input voltage is produced and, under the control of a plurality of biasing voltages and pulse trains, each group of diodes is successively rendered operable and inoperable in such a manner that the associated capacitor, in rotation, is discharged, charged by the input signal through a resistor and then connected across the circuit output, each of the capacitors in the circuit being put through this cycle of operation alternately with the others. Since the steps in the integration process are performed electronically, it will be at once obvious that the problems of mechanical wear, noise due to dirty contacts and commutator segments and other problems inherent in mechanical systems as mentioned above can be eliminated.

The novel features which are believed to be characteristic of the invention, both as to its organization and method of operation, together with further objects and advantages thereof, will be better understood when considered in connection with the accompanying drawings in which an embodiment of the invention is illustrated by way of example.

FIGURE 1 is an illustration in schematic form of a prior art type of mechanical stepping integrator device;

FIGURE 2 is a schematic diagram of an all electronic stepping integrator circuit according to the present invention;

FIGURE 3 is a flow chart of the various voltage waveforms applied to the circuit of FIGURE 2; and FIGURE 4 is a schematic diagram of one segment of the circuit of FIGURE 2 segregated for purposes of explanation.

Referring now to the drawings, the basic structure of a prior art type of stepping integrator device is shown in FIGURE 1. As shown therein, the device comprises three rotatably mounted capacitors 10, 11 and 12 connected in Y and maintained in slidable contact with three commutator segments 13, 14 and 15, commutator segment 13 being connected directly to ground, commutator segment 14 being connected through a resistor 16 to ground, and commutator segment 15 being connected through a resistor 17 to one of a pair of input terminals 18. The other of input terminals 18 is grounded. The capacitances of capacitors 10, 11 and 12 are usually equal and the resistance of resistor 16 is customarily very much greater than that of resistor 17. Furthermore, the product of the resistance of resistor 17 and the capacitance of any one of capacitors 10, 11 and 12 is at least equal to a predetermined time interval T. Resistor 16 is connected across a pair of output terminals 20 and the common junction of Y connected capacitors 10, 11 and 12, designated 21, is connected to ground.

In operation, when a signal is applied to input terminal 18, the capacitor in electrical contact with commutator segment 15, capacitor 12 in FIGURE 1, charges through resistor 17. On the other hand, the capacitor in electrical contact with commutator segment 14, capacitor 11 in the figure, discharges so that the voltage across this capacitor is produced at output terminals 20. The capacitor in contact with commutator segment 13, capacitor 10 in FIGURE 1, is discharged rapidly, however. If the capacitors are rotated through one third of a revolution during time T and if the resistance of resistor 16 is very much greater than that of resistor 17, and, further, if the product of the resistance of resistor 17 and the capacitance of any one capacitor is greater than time T, then the output voltage across resistor 16 is substantially proportional to the true integral of the input voltage that existed in the previous T time interval.

Considering now FIGURE 2 wherein elements corresponding to those in FIGURE 1 are similarly designated, an electronic stepping integrator circuit according to the present invention is shown therein and, as shown, the circuit includes capacitors 10, 11 and 12 in association with several combinations of diodes and resistors which function as switches very much like commutator segments 13, 14 and 15 in FIGURE 1. More particularly, in association with capacitor 10, a diode 22 is connected in series with a resistor 17 between the capacitor and a pair of input terminals 18. The cathode of diode 22 is connected directly to capacitor 10 and the anode of the diode is connected to one end of resistor 17, the other end of the resistor being connected to one of the two input terminals 18. The second input terminal is shorted directly to ground.

The junction between the cathode of diode 22 and capacitor 10 is designated 23. A pair of diodes, generally designated 24 and 25, is connected back-to-back and in series between junction 23 and one end of a common output load resistor 16, the other end of which is connected to a source of direct-current voltage indicated as E. Further considering diodes 24 and 25, the anode of diode 24 is connected to junction 23, the anode of diode 25 is connected to resistor 16, and the cathodes of both diodes are connected to each other at a junction 26 which is connected through a resistor 27 to an input terminal 28. In addition to terminal 28, the circuit also includes input terminals 30 and 31, capacitor 10 being connected between terminal 31 and junction 23, the diode anode and cathode being connected to the designated junction and terminal, respectively.

As before, the capacitances of capacitors 10, 11 and 12 are preferably equal and the resistance of resistor 16 is preferably very much greater than that of resistor 17. Moreover, the product of the resistance of resistor 17 and the capacitance of any one of capacitors 10, 11 and 12 is at least equal to a predetermined time interval the reason for which will become clearer later.

A similar arrangement of diodes and resistors is also associated with capacitor 11. More specifically, a diode 33 is connected between capacitor 11 and resistor 17, the point of connection between capacitor 11 and diode 33 being designated 34 and the junction between the diode and resistor 17 being designated 35. Junction 35 is obviously also common to resistor 17 and diode 22. The cathode of diode 33 is connected to junction 34 and the anode of this diode is connected to junction 35. As before, a pair of diodes, generally designated 36 and 37, is connected back-to-back and in series between junction 34 and resistor 16, the anodes of diodes 36 and 37 being connected to junction 34 and resistor 16, respectively, and the cathodes thereof being connected to each other at a junction designated 38. Junction 38 is connected through a resistor 40 to input terminal 31 and, as previously described, capacitor 11 is connected between junction 34 and input terminal 30. A diode 41 is connected between junction 34 and input terminal 28, the anode of the diode being connected to junction 34 and the cathode thereof being connected to terminal 28.

A third arrangement of elements identical to that heretofore delineated is also associated with capacitor 12. Thus, a diode 42 is connected between capacitor 12 and junction 35, the anode of diode 42 being connected to junction 35 and the cathode thereof being connected to capacitor 12 at a junction 43. Capacitor 12 is connected between junction 43 and input terminal 28. Furthermore, a pair of diodes, generally designated 44 and 45, is connected back-to-back and in series between junction 43 and resistor 16, the anodes of diodes 44 and 45 being connected to junction 43 and resistor 16, respectively, and the cathodes thereof being connected to a common junction 46 which is connected through a resistor 47 to input terminal 30. Finally, a diode 48 is connected between junction 43 and input terminal 31, the anode and cathode of the diode being connected to the mentioned junction and input terminal respectively.

The various circuit arrangements associated with capacitors 10, 11 and 12 and input terminals 28, 30 and 31 are interconnected at several common junctions, namely, junctions 50, 51 and 52. Junction 50 is common to resistor 27, diode 41 and capacitor 12 and, therefore, makes input terminal 28 common to all three elements. Likewise, junction 51 is common to capacitor 10, resistor 40 and diode 48 so that input terminal 31 is common to these three elements. Junction 52, on the other hand, is common to diode 32, capacitor 11 and resistor 47 and, therefore, these three circuit elements are connected to input terminal 30. Finally, it should be mentioned that diodes 25, 37 and 45 are connected to resistor 16 at a common junction 53 which is connected to one of output terminals 20. The other of output terminals 20 is connected directly to a positive source of direct-current voltage E/2.

FIGURE 2 also includes three voltage waveforms designated 54, 55 and 56, the amplitudes of which vary in time between voltage levels E and E/2. Signal 54 is applied to input terminal 31 and, simultaneously therewith, signal 55 is applied to input terminal 30 and signal 56 is applied to input terminal 28. These signals, as shown in the figure, are considered during successive and equal time intervals, only the initial four time intervals, that is, intervals $t_1$, $t_2$, $t_3$ and $t_4$, being considered to facilitate the explanation of the operation of the circuit of FIGURE 1. Thus, during time interval $t_1$ a constant voltage E is applied to terminal 31 by signal 54. Simultaneously, voltages E and E/2 are respectively applied to terminals 30 and 28 by signals 55 and 56. During time interval $t_2$, voltage E is still applied to terminal 31. However, the voltages applied to terminals 30 and 28 are now E/2 and E, respectively. At the end of time interval $t_2$, the voltage level of signal 54 suddenly drops from E to E/2 so that during time interval $t_3$ a voltage E/2 is applied to terminal 31. At the same time, signal 55 experiences a sudden rise in voltage from E/2 to E so that, during time interval $t_3$, a voltage E is applied to input terminal 30. The amplitude of signal 56 remains constant during time interval $t_3$ so that voltage E continues to be applied to input terminal 28 during this period of time. Similar increases and decreases in the amplitudes of signals 54, 55 and 56 occur during time interval $t_4$ so that, as will be seen from FIGURE 2, a voltage E is again applied to input terminal 31 during time interval $t_4$ and voltages E and E/2 are simultaneously impressed on terminals 30 and 28, respectively.

In considering the operation of the circuit of FIGURE 2, it will be expedient for purposes of clarity to discuss or describe the operation of the circuit elements associated with only one of the three capacitors therein, namely, capacitor 11. Accordingly, reference is made to FIGURE 4 wherein capacitor 11 is shown together with its associated circuit elements as heretofore described.

Considering now what happens to the circuit of FIGURE 4 during time interval $t_1$, when signal 54 at voltage level E is suddenly applied to input terminal 31, junction 38 just as suddenly rises to voltage level E. Since a fixed voltage E is applied to resistor 16, junction 53 is also at voltage level E. Accordingly, the cathode and anode of diode 37 are at the same voltage level and, consequently, the diode is in a quiescent state, that is to say, it neither conducts nor is rendered inoperable. At the same time, that is, during interval $t_1$, when signal 55 at voltage level E is suddenly applied to input terminal 30, since the voltage across capacitor 11 cannot change instantaneously, the voltage at junction 34 and, therefore, at the anode of diode 41 is also increased suddenly by E volts. Thus, if there is any initial voltage ΔE across capacitor 11 due to some prior charging of the capacitor, the voltage at junction 34 and the anode of diode 41 is at E+ΔE immediately upon the application of signal 55. On the other hand, during time interval $t_1$, signal 56 is at voltage level E/2 and, therefore, the cathode of diode 41 is at voltage E/2. Accordingly, capacitor 11 discharges through diode 41 until junction 34 is also at voltage level E/2. The entire discharging process occurs very rapidly, almost instantaneously, due to the fact that the resistance in the discharge path is practically nil. It is thus seen that during period $t_1$, capacitor 11 loses any charge which it may have acquired at some earlier time. As a matter of fact, since the internal impedance of the source of signal 56 is necessarily as low as possible, it may be said that capacitor 11 is grounded during time interval $t_1$ for the purpose of neutralizing it.

Having thus established the voltage level at junction 34 as being E/2, it will readily be seen that when an input signal that varies between zero and E/2 volts is applied between input terminals 18, diode 33 is back-biased and, therefore, non-conducting or inoperative. Hence, during time interval $t_1$, no part of the signal applied to input terminals 18 passes through diode 33 to charge capacitor 11, with the result that no integration of the input signal takes place. Thus, since the voltage level at junction 53 and, therefore, at one of output terminals 20, is E and since the voltage constantly applied to the other of output terminals 20 is E/2, the output signal during time interval $t_1$ remains at a constant value of E/2. In other words, the integral of the signal applied to input terminals 18 during time interval $t_1$ does not appear at output terminals 20.

Proceeding now to time interval $t_2$, during this time interval the voltage level of signal 54 applied to input terminal 31 is still E so that the voltage at junction 38 remains at the E level. On the other hand, signals 55 and 56 experience sudden changes in their voltage levels, signal 55 applied to terminal 30 suddenly dropping down to a voltage level of E/2 and signal 56 applied to terminal 28 suddenly rising to voltage level E. Accordingly, for the reasons previously mentioned, the voltage at junction 34 is zero volts and the voltage at the cathode of diode 41 is E volts at the start of interval $t_2$. With these voltages being applied, it will be readily seen that diodes 41, 36 and 37 are back-biased with the result that they act as open circuits. In other words, being back-biased, diodes 41, 36 and 37 are nonconducting. Diode 33, on the other hand, is forward-biased so that when a signal whose amplitude varies between zero and E/2 volts is applied to input terminals 18 during interval $t_2$, capacitor 11 charges through diode 33 and resistor 17, the voltage ΔE developed across capacitor 11 at any moment during this time interval being the integral of the applied signal. The above-described charging state of the circuit of FIGURE 2 continues throughout time interval $t_2$. Since diodes 36 and 37 are back-biased, the output voltage at output terminals 20 remains fixed at E/2 volts.

Considering now time interval $t_3$, here again changes occur in the amplitudes of signals 54, 55 and 56 which affect the condition and operation of the circuit. Thus, during time interval $t_3$, signal 54 drops to voltage level E/2 while signals 55 and 56 are maintained at a voltage level of E. Consequently, when these three signals are applied to input terminals 31, 30 and 28, the voltage at the cathode of diode 41 is E volts whereas the voltage at junction 34 is $E/2+\Delta E$ volts, where ΔE is the voltage developed across capacitor 11 at the end of time interval $t_2$. Diodes 33 and 41, therefore, are back-biased and, thereby, non-conducting. Junction 38, on the other hand, is at voltage level E/2. Accordingly, diodes 36 and 37 are forward-biased and, hence, conducting so that, in essence, diodes 36 and 37 represent shorted connections between junction 34 and junction 53. In other words, voltage $E/2+\Delta E$ appearing at junction 34 also appears at junction 53 and, therefore, at one of output terminals 20. Since the resistance of resistor 16 is quite large, as previously stated, capacitor 11 discharges very little through resistor 16 during time interval $t_3$ so that voltage $E/2+\Delta E$ appears at the stated output terminal for the entire period. Thus, since the other of output terminals 20 is permanently biased at $E/2$ volts, it will be obvious that the voltage developed between output terminals 20 during time interval $t_3$ is equal to $E/2+\Delta E-E/2$ volts or merely ΔE volts which, as heretofore mentioned, is the integral of the signal applied to input terminals 18 during time interval $t_2$.

Following the above-described cycle of operation encompassing time intervals $t_1$, $t_2$ and $t_3$, the operation of the circuit of FIGURE 4 repeats itself, that is to say, during time interval $t_4$, the operation of the circuit is identical with that during time interval $t_1$. The same is true with respect to time intervals $t_5$ and $t_2$, and $t_6$ and $t_3$. Accordingly, any further description of the operation during subsequent intervals of time would merely be repetitious so that no further description is deemed necessary.

It will be remembered that the circuit of FIGURE 4 is only a portion of the over-all stepping integrator circuit shown in FIGURE 2. Accordingly, reference is again made to FIGURE 2. From the explanation given with respect to the circuit of FIGURE 4 it will be recognized at once by those skilled in the art that the circuit associated with each one of capacitors 10, 11 and 12 in FIGURE 2 operates in exactly the same manner, the only difference between them being that they do not operate in synchronism as to the charging and discharging of their respective capacitors. Rather, the three circuits operate in sequence, one of the three charging the associated capacitor, a second circuit neither charging nor discharging its associated capacitor but instead applying the voltage developed there-across to the circuit output terminals, and the third circuit discharging the associated capacitor. Stated differently, during any one time interval, one of the three individual circuits in the over-all circuit of FIGURE 2 performs the operation previously described as being performed by the circuit of FIGURE 4 during time interval $t_1$, a second of the three circuits performs the operation previously described as occurring during time interval $t_2$, and the third such circuit performs the operation expected during time interval $t_3$. Needless to say, during the time interval, the three operations are performed simultaneously.

During the next unit of time, the operation of each of the individual circuits of FIGURE 2 switches to another of the three operations in the cycle and during the third time interval each circuit switches to the third step in its cycle. Thus, at any one time, one of capacitors 10, 11 and 12 is being charged by the signal applied to input terminals 18, a second of the three capacitors is being discharged, and the third of the three capacitors is connected across output terminals 20 to impress thereacross the integral of the signal applied during the previous charging period for that capacitor.

It should be noted that although the circuit of the present invention has been described in connection with the stepped integration of positive signals applied to the circuit, that is, signals varying in time between zero and $+E/2$ volts, the circuit may also readily be adapted for operation in connection with the application of negatively varying signals or, stated more specifically, signals varying between zero and $-E/2$ volts. Such an adaptation can be accomplished by reversing the connections of all the diodes in the circuit of FIGURE 2 as well as the polarity of all the signals applied thereto. Taking a single diode by way of example, namely diode 32, instead of connecting diode 32 as shown in FIGURE 2, the cathode would instead be connected to junction 23 whereas the anode would be connected to input terminal 28. As for signal 56 applied to input terminal 28, instead of varying between $+E/2$ volts and E volts, in the modified circuit signal 56 would vary from $-E/2$ volts to $-E$ volts. Similar treatment would be accorded to the remaining diodes in the circuit and signals applied thereto.

It should further be noted that although the circuit of the present invention has been described in connection with the use therein of diodes, other electronic elements performing in the same manner as these diodes may also be employed. In short, since the diode is one member of the rectifier family, any rectifier element, such as selenium rectifiers, may be utilized with equally good effect.

Having thus described the invention, what is claimed is:

1. An electronic stepping integrator circuit for producing an output signal at a pair of output terminals that is proportional to the integral of the input signal applied to a pair of input terminals in response to first and second fixed voltages and first, second and third signals periodically varying between first and second voltage levels, said circuit comprising: first and second junctions; first, second and third diodes, each having first and second electrodes, connected in series between said first and second junctions, the first electrodes of said first and third diodes being connected to said first and second junctions, respectively, the second and first electrodes of said first and second diodes, respectively, being connected to each other, and the second electrodes of said second and third diodes being connected to each other; fourth, fifth and sixth diodes, each having first and second electrodes, connected in series between said first and second junctions, the first electrodes of said fourth and sixth diodes being connected to said first and second junctions, respectively, the second and first electrodes of said fourth and fifth diodes, respectively, being connected to each other, and the second electrodes of said fifth and sixth diodes being connected to each other; seventh, eighth and ninth diodes, each having first and second electrodes, connected in series between said first and second junctions, the first electrodes of said seventh and ninth diodes being connected to said first and second junctions, respectively, the second and first electrodes of said seventh and eighth diodes, respectively, being connected to each other, and the second electrodes of said eighth and ninth diodes being connected to each other; first, second and third means for receiving the first, second and third signals, respectively; first, second and third capacitors connected between said first, second and third means and the second electrode of said first, fourth and seventh diodes, respectively; first, second and third resistors connected between said third, first and second means and the second electrode of said third, sixth and ninth diodes, respectively; tenth, eleventh and twelfth diodes, each having first and second electrodes, the first electrodes of said tenth, eleventh and twelfth diodes being connected to the first electrodes of said second, fifth and eighth diodes, respectively, and the second electrodes of said tenth, eleventh and twelfth diodes being connected to said second, third and first means, respectively; an input resistor connected between the input terminals and said first junction; fourth and fifth means for receiving the first and second fixed voltages, respectively; and an output load resistor connected between said fourth means and second junction, the output terminals being connected between said second junction and said fifth means.

2. The stepping integrator circuit defined in claim 1 wherein said first and second electrodes are the anode and cathode, respectively.

3. The stepping integrator circuit defined in claim 1 wherein said first and second electrodes are the cathode and anode, respectively.

4. The integrator circuit defined in claim 1 wherein said first and second electrodes are the anode and cathode, respectively.

5. In an electronic stepping integrator network wherein an output signal is produced at a pair of output terminals that is proportional to the integral of the input signal applied to a pair of input terminals, a single stepping integrator circuit comprising: a resistor connected at one end to the input terminals; means for receiving a plurality of variable and fixed voltage level signals; a capacitor connected at one end to a first of said variable voltage level signals; and switching means coupled to said resistor and capacitor and to said means to receive said variable and fixed voltage level signals, said switching means being responsive to said plurality of variable and fixed voltage level signals for sequentially connecting the other end of said capacitor to the other end of said resistor, to the output terminals, and to ground for neutralization thereof.

6. The single stepping integrator circuit defined in claim 5 wherein said switching means includes: first, second, third and fourth diodes, each having first and second electrodes, the first and second electrodes of said first diode being connected to the other ends of said resistor and capacitor, respectively, the first electrodes of said second and third diodes being connected to the other end of said capacitor and to the output terminals, respectively, the second electrodes of said second and third diodes being connected to each other, and the first and second electrodes of said fourth diode being connected to the other end of said capacitor and to a second of said variable voltage level signals, respectively; and first and second resistors connected between the first and second electrodes, respectively, of said third diode and a fixed voltage level signal and a third of said variable voltage level signals, respectively.

7. An electronic stepping integrator circuit responsive to first and second fixed voltages and first, second and third variable voltage signals cyclically alternating between first and second voltage levels and equally phased from each other for producing an output signal at a pair of output terminals that is proportional to the integral of an input signal applied to a pair of input terminals, said circuit comprising: a resistor; first, second and third capacitors; and first, second and third switching circuits coupled to said resistor and said first, second and third capacitors, said switching circuits being receptive of the first, second and third variable voltage signals and the first and second fixed voltages and operable in response thereto for cyclically connecting said first, second and third capacitors, respectively, to the input terminals through said resistor, to the output terminals and to ground for neutralization thereof, the above-said operative cycles for said capacitors being phase with respect to each other according to the phasing of the variable voltage signals, each of said first, second and third switching circuits including first, second and third unidirectional means connected in series between said resistor and the output terminals for selectively connecting the associated capacitor to said resistor and to the output terminals in response to the first, second and third variable voltage level signals and further including fourth unidirectional means connected in shunt with said associated capacitor for selectively connecting said associated capacitor to ground in response to the first, second and third signals, said first, second and third unidirectional means effectively being open circuits and said fourth unidirectional means effectively being a short circuit when the first signal is at one of the first and second voltage levels and the second and third signals are at the other of the first and second voltage levels, said first unidirectional means effectively being a short circuit for connecting said associated capacitor to said resistor and said second, third and fourth unidirectional means effectively being open circuits when the second signal is at said one voltage level and the first and third signals are at said other voltage level, said first and fourth unidirectional means effectively being open circuits and said second and third unidirectional means effectively being short circuits for connecting said associated capacitor to the output terminals when the first and second signals are at said other voltage level and the third signal is at said one voltage level.

References Cited in the file of this patent
UNITED STATES PATENTS

| | | |
|---|---|---|
| 2,336,929 | Doyle | Dec. 14, 1943 |
| 2,637,010 | Charske | Apr. 28, 1953 |